(12) United States Patent
Shaio

(10) Patent No.: US 6,487,167 B1
(45) Date of Patent: Nov. 26, 2002

(54) EXCLUSION LIST OF SENDERS TO AN AUTONOMOUS SYSTEM

(75) Inventor: Jack Shaio, Winchester, MA (US)

(73) Assignee: Nortel Networks Limited, St. Laurent (CA)

(*) Notice: Subject to any disclaimer, the term of this patent is extended or adjusted under 35 U.S.C. 154(b) by 0 days.

(21) Appl. No.: 09/265,904

(22) Filed: Mar. 10, 1999

(51) Int. Cl.[7] .............................................. H04L 12/56
(52) U.S. Cl. .................... 370/3.92; 370/400; 709/220; 709/232; 709/237; 709/238
(58) Field of Search .......................... 370/221, 231, 370/235, 250, 254, 351, 400, 401, 389, 392; 709/220, 232, 233, 234, 235, 238, 241, 249

(56) References Cited

U.S. PATENT DOCUMENTS

| | | | | |
|---|---|---|---|---|
| 4,718,002 A | * | 1/1988 | Carr | 364/200 |
| 5,506,847 A | * | 4/1996 | Shohatake | 370/392 |
| 5,699,517 A | * | 12/1997 | Yamasaki | 395/200.03 |
| 5,754,790 A | * | 5/1998 | France et al. | 395/200.68 |
| 6,052,736 A | * | 4/2000 | Ogle et al. | 709/244 |
| 6,304,908 B1 | * | 10/2001 | Kalajan | 709/229 |
| 6,331,983 B1 | * | 12/2001 | Haggerty et al. | 370/400 |
| 6,339,595 B1 | * | 1/2002 | Rekhter et al. | 370/392 |
| 6,377,990 B1 | * | 4/2002 | Slemmer et al. | 709/225 |

* cited by examiner

Primary Examiner—Alphus H. Hsu
Assistant Examiner—Roberta A Stevens
(74) Attorney, Agent, or Firm—Bromberg & Sunstein LLP

(57) ABSTRACT

A method which can be implemented on a computer program product for use on a network of autonomous systems to provide an ability to exclude the routing of messages to a destination IP address through a specified autonomous system. On a network in which each autonomous system ignores update messages that already include its identification number and adds it own identification number to update messages that it forwards, the method involves adding the identification number of the specified autonomous system to any update message created for the destination IP address.

12 Claims, 3 Drawing Sheets

EXCLUSION LIST OF SENDERS TO AN AUTONOMOUS SYSTEM

BACKGROUND OF THE INVENTION

The embodiments of the invention are directed to a method by which a user of the Internet may identify autonomous systems through which incoming messages to the user will not pass.

The Internet is a network of computers divided into autonomous systems. An autonomous system is responsible for routing packets within its domain. The routing of packets between autonomous systems is performed using an interautonomous system routing protocol, such as the BGP4 protocol. Each autonomous system is identified on the network by its unique 16-bit identifier. The interautonomous system routing protocol allows an autonomous system to find the neighboring autonomous system to which a packet is to be sent for getting to a destination IP address. The protocol also provides to the autonomous system the entry point at the autonomous system where the packet should be forwarded. The interautonomous system routing protocol is used at each autonomous system to route the packet through the network of autonomous systems to the destination address.

The embodiments of the present invention are for use with an interautonomous system routing protocol that includes a method for preventing routing loops. For example, BGP speakers on autonomous systems are used to propagate (advertise) BGP update messages throughout the Internet. Update messages inform autonomous systems of where to send a message addressed to a particular IP address. The message includes the entry point to the autonomous systems that sent the message. The message also includes network layer reachability information which is a list of IP addresses on the network reachable from the advertising autonomous system. Thus, an autonomous system receiving an update message will know that to reach any of those network addresses, it may send a message to the entry point indicated on the update message. An update message includes a list of the autonomous system identifiers for all the autonomous systems the update message has passed through. As an autonomous system receives an update message, it adds its identifier to the update message so that if the update message is sent back to that autonomous system, it will know to ignore the message. This prevents the message from returning to an autonomous system to which it has already passed thereby resulting in a routing loop.

There are situations in which a user at a particular IP address would prefer that messages it is receiving not come through a particular autonomous system. This may be particularly true for user destinations at which confidential or highly sensitive information may be communicated. It may be undesirable for such messages to travel through an autonomous system that is viewed as being insecure. It would therefore be desirable for an Internet customer to have the ability to identify a list of autonomous systems to be excluded from passing messages on their way to the customer's IP address.

SUMMARY OF THE INVENTION

Embodiments of the invention are directed toward producing an exclusion list of autonomous systems through which messages are prevented from passing to a particular destination IP address. A method involves adding the identification number of each autonomous system specified in the exclusion list onto any update message created for the destination IP address. An autonomous system routing protocol speaker implementing the invention includes a data input for receiving instructions to exclude message routing through a specified autonomous system to a destination IP address. The speaker further includes program code for creating update messages that will include an identification number of the specified autonomous system to be excluded.

A computer program product for implementing the exclusion of an autonomous system includes program code for creating an update message for an IP address. The computer program product further includes program code for determining whether any of the IP addresses in the update message have issued instructions to exclude certain autonomous systems from passage of incoming messages. When an exclusion list exists, the program code further includes instructions for adding an identification number of the specified autonomous system to the update message. Alternatively, a computer program product may include code for separating the update message into an update message for IP addresses for which instructions to exclude autonomous systems were not received and an update message for the remaining IP addresses. The program code would add the identification number of the specified autonomous system to the update message directed for the other IP addresses including those that had an exclusion list.

A network of autonomous systems in accordance with an embodiment of the invention includes a receiver in each autonomous system adapted to receive update messages from peer autonomous systems. Each autonomous system retains routing information indicating which peer autonomous systems provided an update message associated with a given IP address identifier only for update messages which did not include the autonomous system's own identification number. Program code with exclusion list capability is responsive to instructions to exclude routing of messages through a specified autonomous system to an IP address by creating update messages for the IP address that include the identification number of the specified autonomous system.

In accordance with the embodiments of the invention, a user at an IP address can identify autonomous systems through which messages to that IP address will not be sent. Other objects and advantages of the invention will become apparent during the following description of the presently preferred embodiments of the invention taken in conjunction with the drawings.

DETAILED DESCRIPTION OF THE PREFERRED EMBODIMENTS

Figure 1:
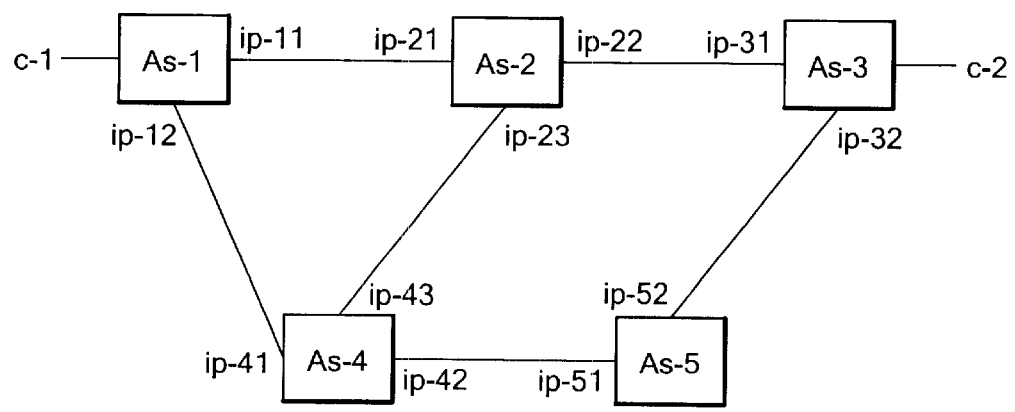
FIG. 1 is a schematic diagram of a network of autonomous systems.

Referring now to FIG. 1, a network of autonomous systems as one would find on the Internet is shown. On the Internet, each autonomous system has a 16-bit identification number. In the drawing, the autonomous systems are numbered AS1–AS5. Each autonomous system has one or more ports which act as entry points or exit points for interautonomous system message traffic. Each port is identified by an Internet protocol (IP) address. Various customers sign up for use of the Internet through any given autonomous system. Each customer has an IP address used to identify it on the network of autonomous systems. In order for a message to work its way through the maze of autonomous systems from one customer to another customer on a different autonomous system, interautonomous system routing protocols are used. The interautonomous routing protocol currently used on the Internet is BGP4. In order for autonomous systems to learn where they should be sending messages directed to a particular IP address, an autonomous system with a new customer advertises the IP addresses of the customer to its neighboring, i.e., peer, autonomous systems. For example, the interautonomous system routing protocol speaker in AS3 advertises the IP addresses of customer C2 to its peers AS2 and AS5. These systems may in turn advertise the addresses to their peers. An update message which advertises an IP address will include an identifier that corresponds with the IP address of the new customer. The update message also includes the entry point into the autonomous system that was used to send the update message. An identifier may be the IP address itself or a summary of several IP addresses. For example, AS3 can advertise to AS2 the C2 addresses and says that all traffic destined to them should enter it at IP31. It sends a similar update message to AS5 but uses IP32 as the entry point. Each autonomous system changes the entry point in the message to its own entry point as the message is propagated through the network.

Without an appropriate interautonomous system protocol, this can cause a routing loop. A loop occurs if when trying to send a message from C1 to C2, it travels from AS1 to AS4 at IP 41, from AS4 to AS2 at IP23, and then back from AS2 to AS1 at IP11. The interautonomous system routing protocol avoids routing loops by including a list of the autonomous systems that have propagated the update message. This mechanism is a part of the current BGP protocol. It works as follows. AS3 sends an update message for C2 which includes the identifier for AS3. AS2 receives the message and sends out a message for C2 that includes the identifiers for AS2 and AS3. When this message is sent to AS1, AS1 also sends out an update message for C2 that includes a list including AS1, AS2 and AS3. The message goes to AS4 who sends an update message for C2 including a list of AS4, AS1, AS2 and AS3. When AS4 sends that message to AS2, AS2 discards the update or ignores it when it arrives at IP23 because it sees AS2 in the list. By ignoring the message, AS2 will not forward it to another peer autonomous system nor will AS2 add it to its own routing information.

Figure 2:
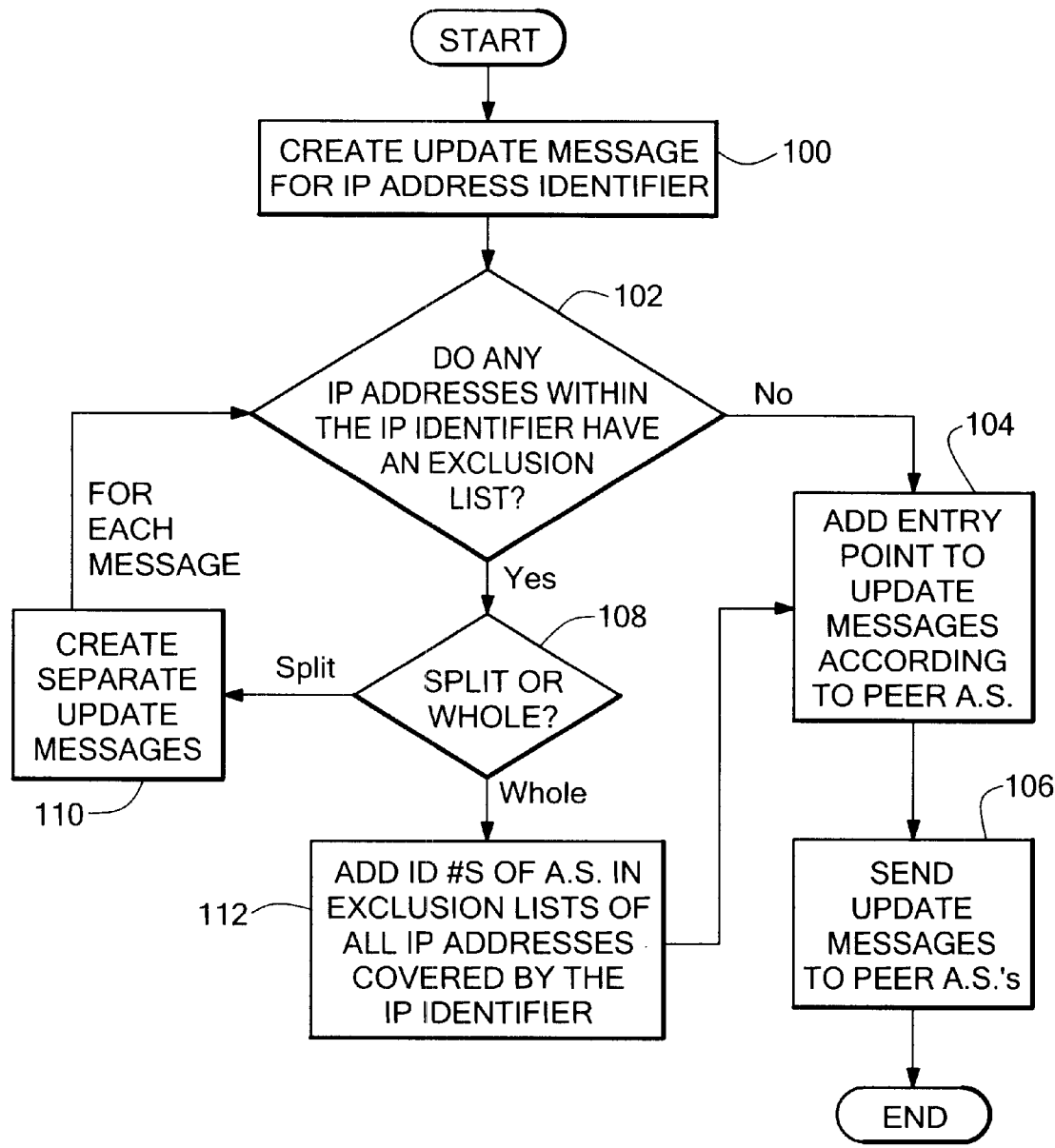
FIG. 2 is a flow chart of a computer program including a method for excluding routing of messages to a destination IP address through a specified autonomous system.

In accordance with an embodiment of the invention, program code may be included in an autonomous system routing protocol speaker to create update messages responsive to instructions from the user for excluding routing of messages to the user's destination IP address through a specified autonomous system, as shown in FIG. 2. This code is responsive to a request from a customer such as C2 that an autonomous system, for example AS4, be excluded from passing messages to the customer. To be effective, this request would be made known to the autonomous system upon signing up C2 as a customer. Over time, AS3 learns IP addresses in the customer C2 location or facility as they are advertised or allocated by AS3. As addresses are learned, AS3 builds the update messages 100 to propagate the C2 addresses onto the network of autonomous systems.

The C2 addresses will be referenced in the network layer reachability information by an IP address identifier indicative of the address or addresses.

In creating an update message, AS3 checks the block of C2 addresses against a table of exclusions 102 in which any instructions to exclude are indicated in association with the IP address(es) of the requester. If no such exclusions are found, the appropriate entry point to the autonomous system can be added to each message 104 and the update messages sent 106 to the peer autonomous systems. If exclusions are found, the program code may take one of two alternate routes. The choice of routes may be present or selectable. The code may split the update message into several update messages or it may keep the message whole 108. The splitting option permits updates for addresses that do not request exclusions to be sent out on their own so that these addresses are reachable through the otherwise excluded autonomous systems. Assuming the message will be kept whole, the program code adds to the update message the list of autonomous systems on the excluded list for any of the addresses in the update message 112. Then the message to each peer autonomous system will be given the appropriate entry point 104. For example, the update message from AS3 to AS2 would be given IP31, whereas the update message sent from AS3 to AS5 will indicate an entry point of IP32. AS3 then sends out 106 the updates to the peer autonomous systems. To be precise, the BGP speaker in AS3 connected to IP31 sends the update to AS2 and the BGP speaker in AS3 connected to IP32 sends the update to AS5. The update is transmitted within the autonomous system using an intraautonomous system routing protocol.

Propagation of these update messages proceeds in accordance with an interautonomous system routing protocol such as BGP4. Any autonomous system receiving an update message that lists its own identification number in the message will ignore the update. Each autonomous system that receives an update message that does not include itself on the list may add the routing information in the update message to the routing tables inside its own autonomous system. Some messages from among those whose information is stored into the routing tables will be advertised to neighboring autonomous systems. Before advertising the information further, the autonomous system will add itself to the routing list and send the update message out to its peer autonomous systems. The autonomous systems adding the update to their routing tables will indicate the customer IP addresses along with the entry point to be used in sending a message along to that IP address. Upon sending out the propagated update message, the autonomous system will replace the entry point with its own entry point for the peer system to whom an update message is being sent.

In the event that the message being created is to be split, the customer addresses in the update message are separated, some into one message and some into a second update message 110. The creation of an update message routine is then performed for each of the new lists of customer addresses. This process ultimately results in making an update message for IP addresses that do not request exclusions and an update message for addresses that include one or more addresses with an exclusion list.

As discussed above, the method for excluding routing of messages to a destination IP address through a specified autonomous system may be implemented as a computer program product for use with a computing unit in apparatus such as an interautonomous system protocol speaker or a router. Such implementation may include a series of computer instructions fixed either on a tangible medium, such as a computer readable medium (e.g., a diskette, CD-ROM, ROM, or fixed disk) or transmittable to a computing unit, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a interautonomous system protocol speaker (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software (e.g., a computer program product).

Figure 3:
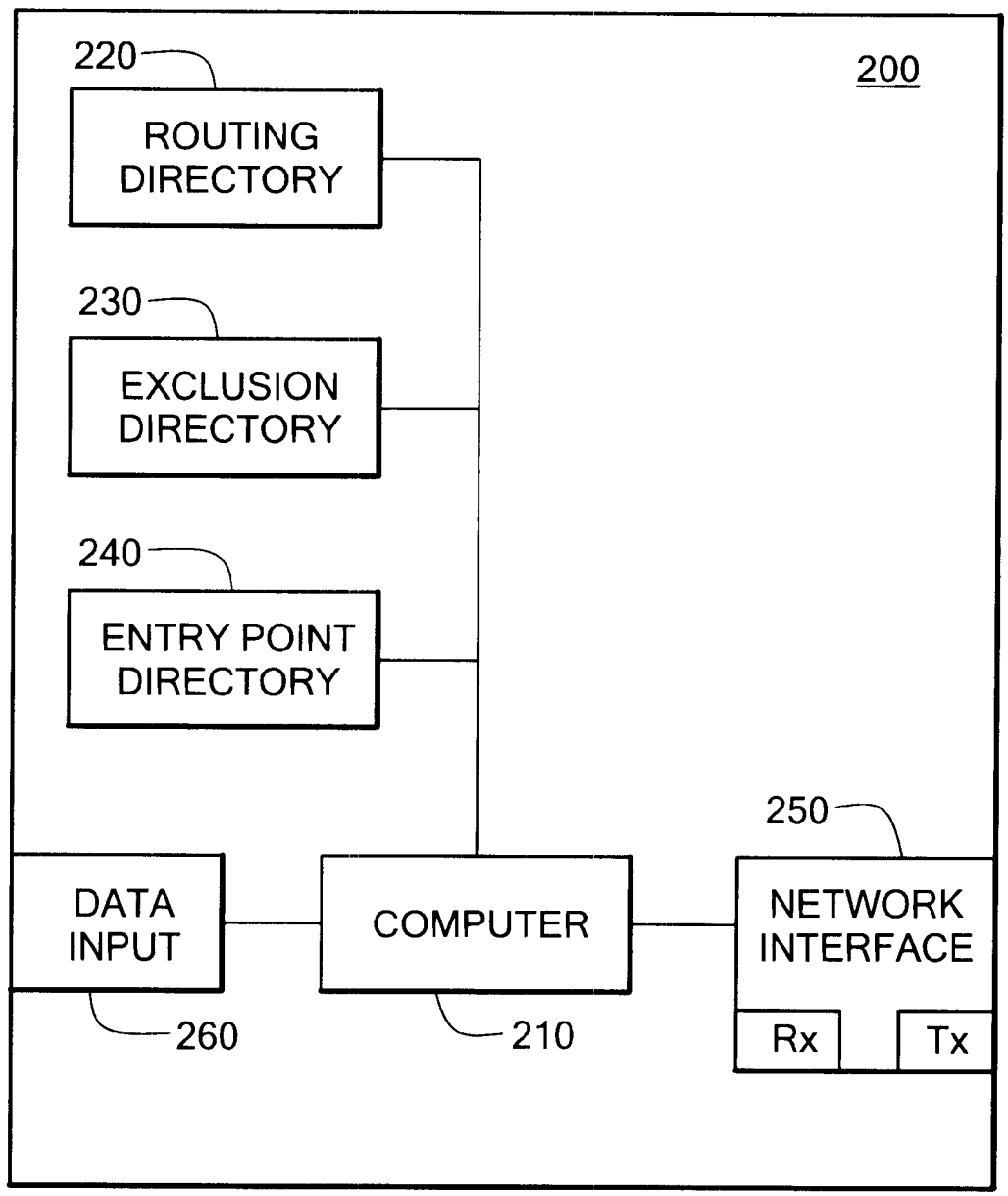
FIG. 3 is a schematic block diagram of an autonomous system routing protocol speaker for use on the network of FIG. 1.

Referring now to FIG. 3, a block representation of an interautonomous system routing protocol speaker 200 is shown. The speaker performs the interautonomous system protocol and includes the program code for performing the functions set forth in FIG. 2. The program is run on a computer 210, microprocessor or other processing unit in the BGP speaker. The program code may be contained within the computer 210 or on memory accessible to the computer. In a random access memory, several lists or directories are maintained by the computer 210 for performing the interautonomous system protocol. A routing directory 220 includes a list of known updates and advertisers. Each entry includes the reachable IP addresses, the IP address of the entry point and the identity of the autonomous system where the entry point is located, that being the autonomous system that sent the update. An exclusion directory 230 holds the exclusion list for the autonomous system in which the speaker is located. Each entry in the list includes the relevant IP addresses and the associated list of autonomous systems to avoid. An entry point directory 240 provides a list of IP interfaces to use as entry points into the autonomous system of the speaker. From this directory, the speaker identifies the appropriate entry point for insertion on an update message being created in accordance with FIG. 2. The speaker 200 communicates with the network of autonomous systems through network interface 250. The network interface 250 includes a receiver and a transmitter for receiving and sending interautonomous system messages, including update messages. A customer's request for exclusion of a specified autonomous system is delivered to the speaker through a data input 260. A user interface, graphic or textual, may be provided in communication with the speaker 200 through the data input 260. The user interface would simplify the task of entering exclusion lists onto the interautonomous system routing protocol speaker 200.

Of course, it should be understood that various changes and modifications to the preferred embodiments described above will be apparent to those skilled in the art. For example, the sequence in which the program code is executed may be changed without altering the desired result of autonomous system avoidance. This and other changes can be made without departing from the spirit and scope of the invention, and without diminishing its attendant advantages. It is therefore intended that such changes and modifications be covered by the following claims.

I claim:

1. On a network of autonomous systems each having an identification number, said network using an inter-autonomous system routing protocol in which routes to an IP address are learned through propagation of update messages for that IP address from one autonomous system to another, each autonomous system ignoring any update message that already includes its identification number and adding its own identification number to update messages being forwarded, a method for excluding routing of messages to a destination IP address through a specified autonomous system comprising the steps of:

adding the identification number of the specified autonomous system to any update message created for the destination IP address.

2. The method of claim 1 further comprising sending said any update message to a peer autonomous system.

3. The method of claim 1 further comprising creating an update message and determining whether the update message is for the destination IP address.

4. The method of claim 3 further comprising separating the update message into an update message for the destination IP address and an update message for other IP addresses.

5. An autonomous system routing protocol speaker for use on a network of autonomous systems each having an identification number, said network using an inter-autonomous system routing protocol in which routes to an IP address are learned through propagation of update messages for that IP address from one autonomous system to another, each autonomous system ignoring any update message that already includes its identification number and adding its own identification number to update messages being forwarded, wherein said speaker creates update messages for IP addresses within its respective autonomous system, said speaker comprising:

a data input adapted to receive instructions to exclude message routing through a specified autonomous system of incoming messages to a destination IP address; and program code, responsive to the instructions, which creates an update message for the destination IP address that includes an identification number of the specified autonomous system.

6. The autonomous system routing protocol speaker of claim 5 further comprising a transmitter to send the update message to a peer autonomous system on the network.

7. The autonomous system routing protocol speaker of claim 5 further comprising a user interface through which a user may send the instructions to the data input.

8. The autonomous system routing protocol speaker of claim 5 further comprising program code for determining whether the update message is for the destination IP address.

9. The autonomous system routing protocol speaker of claim 5 further comprising program code for separating the update message into an update message for the destination IP address and an update message for other IP addresses.

10. A computer program product for use in an autonomous system on a network of autonomous systems each having an identification number, said network using an inter-autonomous system routing protocol in which routes to an IP address are learned through propagation of update messages for that IP address from one autonomous system to another, each autonomous system ignoring any update message that already includes its identification number and adding its own identification number to update messages being forwarded, the computer program product comprising a computer usable medium having computer readable program code thereon, the computer readable program code including:

program code for creating an update message for one or more IP addresses serviced by the autonomous system;

program code for determining whether for any of the IP addresses in the update message instructions were received to exclude routing of messages through a specified autonomous system of incoming messages to such IP address; and program code, responsive to the instructions, for adding an identification number of the specified autonomous system to the update message.

11. A computer program product for use in an autonomous system on a network of autonomous systems each having an identification number, said network using an inter-autonomous system routing protocol in which routes to an IP address are learned through propagation of update messages for that IP address from one autonomous system to another, each autonomous system ignoring any update message that already includes its identification number and adding its own identification number to update messages being forwarded, the computer program product comprising a computer usable medium having computer readable program code thereon, the computer readable program code including:

program code for creating an update message for one or more IP addresses serviced by the autonomous system;

program code for determining whether for any of the IP addresses in the update message instructions were received to exclude routing of messages through a specified autonomous system of incoming messages to such IP address;

program code, responsive to the instructions, for separating the update message into an update message for IP address for which instructions to exclude were not received and an update message for other IP addresses; and program code for adding an identification number of the specified autonomous system to the update message for the other IP addresses.

12. A network of autonomous systems comprising:

a receiver in each of said autonomous systems adapted to receive update messages from peer autonomous systems;

means, in each of said autonomous systems, for retaining routing information comprised of an indication of which peer autonomous system provided an update message associated with a given IP address identifier for update messages which did not include the autonomous system's own identification number; and program code in at least one of said autonomous systems, responsive to instructions to exclude routing of messages through a specified autonomous system to an IP address, for creating update messages for the IP address that include the identification number of the specified autonomous system and an IP address identifier inclusive of the IP address.

* * * * *